United States Patent [19]
Schoppee

[11] 3,943,809
[45] Mar. 16, 1976

[54] ROTARY TAB CUTTER

[75] Inventor: Lawrence W. Schoppee, Springfield Alfred D'Antonio, East Longmeadow, both of Mass.

[73] Assignee: Package Machinery Company, East Longmeadow, Mass.

[22] Filed: June 17, 1975

[21] Appl. No.: 587,643

[52] U.S. Cl. ..................... 83/311; 83/349; 83/658; 83/670; 83/673; 83/686; 83/690; 83/694; 93/58.4
[51] Int. Cl.².. B23D 25/02; B26D 1/56; B26D 7/20
[58] Field of Search ............. 83/349, 311, 658, 670, 83/673, 678, 684, 685, 686, 690, 694; 93/58.4, 58.5, 36 B

[56] References Cited
UNITED STATES PATENTS
3,769,868  11/1973  Hornung .......................... 83/349

Primary Examiner—Donald R. Schran
Assistant Examiner—W. D. Bray
Attorney, Agent, or Firm—McCormick, Paulding & Huber

[57] ABSTRACT

A continuously moving web passes over a fixed female die, which die is slotted to define a U-shaped cutting edge. A cylindrical punch rotates on an axis above the path of the web so that a cutting edge defined at the free end of the punch moves into the slot defined in the fixed die to cut a tab in the web. The length of the tab so cut can be varied by changing the relative speed of movement between the punch and that of the web, and the punch is mounted at an offset to its rotational axis. If such offset is positive, that is in the direction of rotation, the tab can be formed to "lead" the web. Providing the offset in the opposite or negative direction, the tab "trails" the web.

10 Claims, 13 Drawing Figures

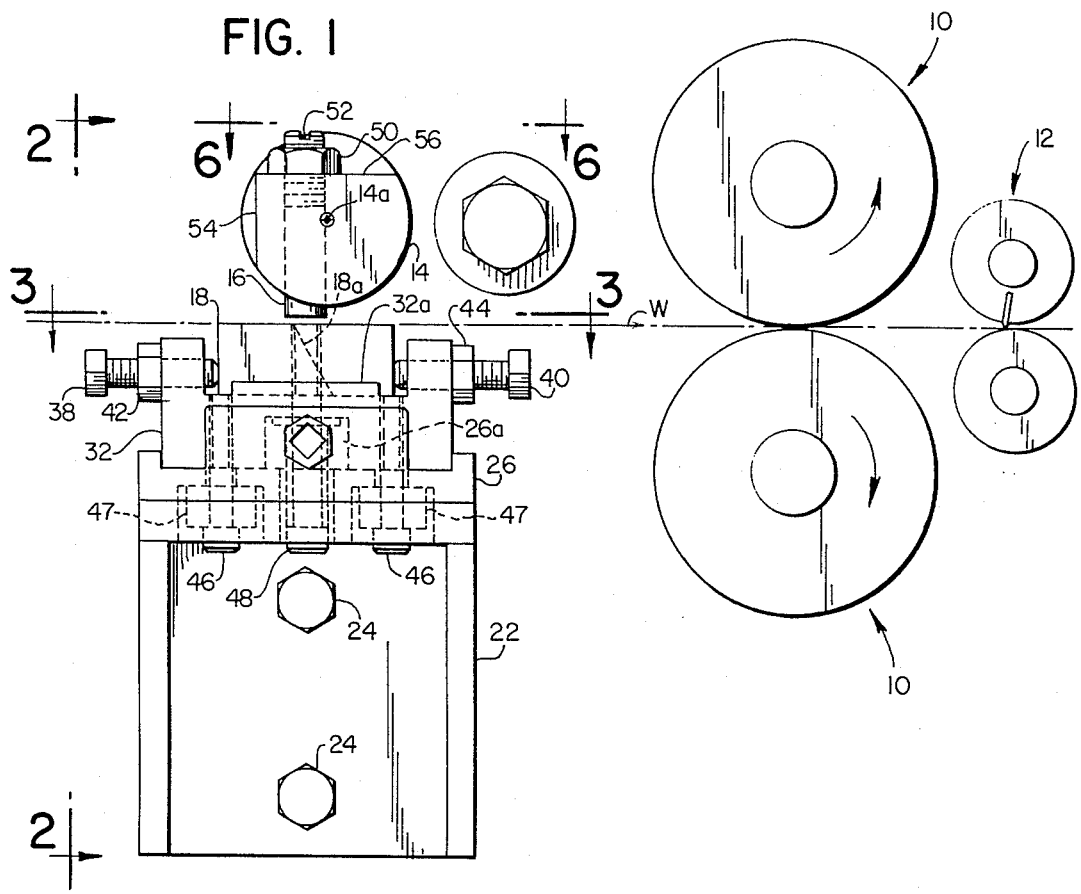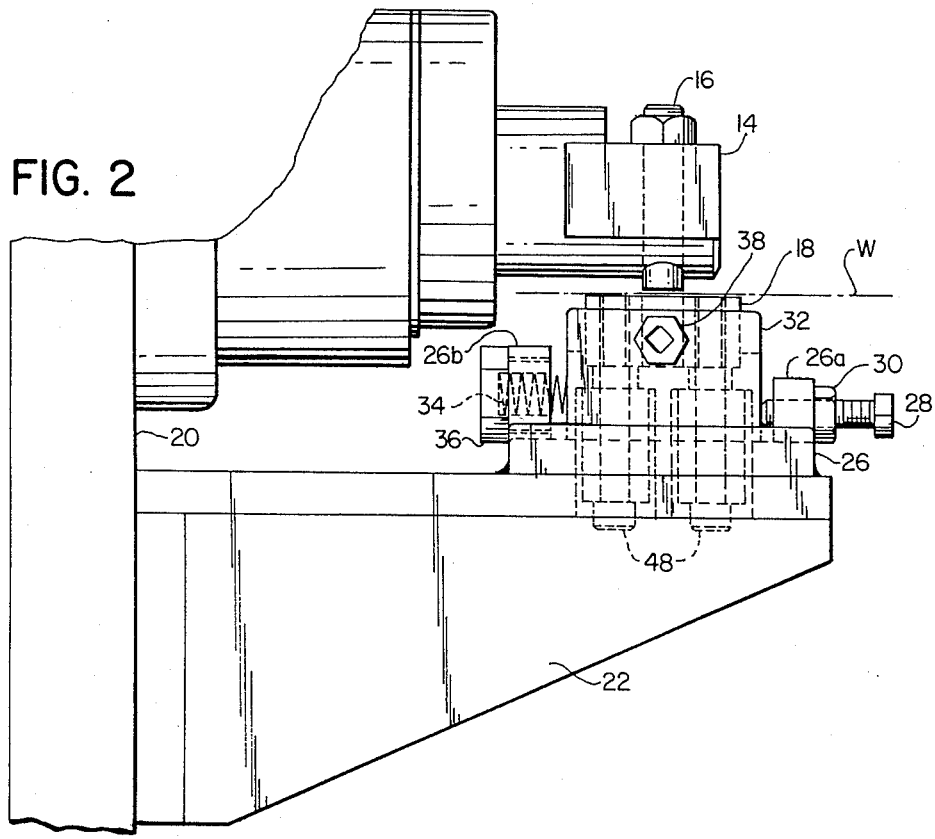

ROTARY TAB CUTTER

SUMMARY OF THE INVENTION

This invention relates generally to rotary tab cutters, and deals more particularly with a rotating male punch which cooperates with a fixed slotted female die so as to cut a continuously moving web and form a tab in the web.

An object of the present invention is to provide a device for cutting a tab from a continuously moving web, which device includes male and female die parts having their cutting edges so designed that they hold their edges for a period of use far in excess of that heretofore possible with prior art continuous motion web cutters of the crescent type. Further, these die parts are uniquely constructed and mounted so that they are easily resharpened and readjusted even when they do become worn as a result of such relatively long periods of use.

A device constructed in accordance with the present invention includes a fixed female die part across which the web moves, and which fixed die has a slot defining a U-shaped cutting edge. A cylindrical punch member is mounted in a shaft, at an offset, so that a semi-circular cutting edge on the end of the punch moves into the slot of the fixed die, and the speed of movement of the punch is matched to that of the web so as to form a tab therein. The length of the tab's sides can be extended as a result of varying the relative speed between the punch and the web. Providing the offset in one rotational direction cuts a "trailing" tab, and offsetting the punch in the opposite direction in the shaft cuts a "leading" tab in the continuously moving web.

BRIEF DESCRIPTION OF THE DRAWINGS

FIG. 1 is a side elevational view of an apparatus incorporating the present invention, the web to be cut is illustrated in phantom lines and the means for feeding the web, and for cutting the web into segments of predetermined length, is illustrated in schematic fashion.

FIG. 2 is a vertical sectional view taken generally on the line 2—2 of FIG. 1, that is looking in the downstream direction with respect to the path of travel of the web.

DETAILED DESCRIPTION

Figure 3:
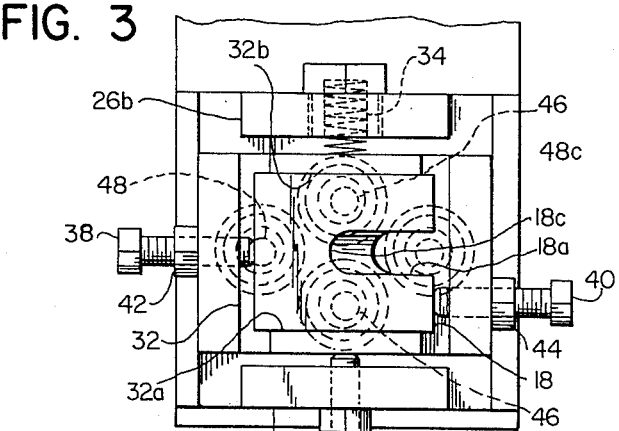
FIG. 3 is a horizontal sectional view taken generally on the line 3—3 of FIG. 1 and illustrates in plan view the configuration of the fixed female die and its associated supporting structure.

Turning now to the drawings in greater detail, FIG. 1 shows in somewhat schematic fashion the essential elements of an apparatus incorporating the present invention, said apparatus including feed rolls 10, 10 which rolls are adapted to feed a continuous web W, of paper material such as is commonly used for the outer wrapper of a gum package or the like, generally in the direction of the arrow indicated in FIG. 1 at reference letter W. As is conventional practice such an apparatus also includes cutter means 12, for severing the web W at predetermined longitudinally spaced locations in order to provide a wrapper of suitable size for packaging a predetermined number of gum sticks or the like. In accordance with the present invention a tab cutting device is provided upstream of the cutter 12 so as to form a crescent shaped tab in the web at a position correllated to that longitudinal portion at which the web will be severed by the cutter 12.

A gum package wrapper is generally provided with such a tab to permit the package to be readily opened, either as a result of including a tear strip with an end portion protruding through the opening defined by the cut tab, or as a result of providing a tab which projects from the wrapped package in order to permit the consumer to tear open the package in a convenient manner. In any event, it is important to note that the operation of the cut-off device 12 is timed with respect to that of the rotary tab cutter to be described, such that the tab is formed at a position where the cut-off device 12 will ultimately sever the web. Obviously the cut-off blade of device 12 will be itself notched so as to leave the tab attached as is conventional practice with such devices.

Turning next to a more detailed description of the tab cutter, a rotating shaft 14 is shown in FIG. 1, and is driven in timed relationship with the speed of movement of the web W such that a rotating punch 16 cooperates with a fixed die 18 located below the path of travel of the web in order to form the desired tab as a result of the cutting process achieved by these novel die elements. The rotating punch 16 mounted in the shaft 14 follows a path of movement illustrated in FIGS. 4a, 4b, 4c and 4d, and it is noted that the tab configuration produced thereby will be of the "trailing" type, that is trailing tab will be produced on the trailing edge of the wrapper segment cut by the cut-off device 12 from the continuous web W.

In an alternative configuration of the invention the punch 16 is provided on the opposite side of the axis of rotation of the shaft 14 with the result that the punch 16 follows the path of movement depicted in FIGS. 5a, 5b, 5c and 5d resulting in a leading tab configuration whereby the tab is formed at the leading edge of the paper web segment produced by the cut-off device 12. In the drawings, FIGS. 1, 2, 3 and 6 relate specifically to the configuration for producing a "trailing" tab, but it will be apparent from the description to follow that a simple reversal of the punch position in the shaft 14 will result in a so-called "leading" tab construction in the cut-off web segments.

FIG. 2 shows a fixed machine frame 20 adapted to support the rotating rotary tab cutting device of the present invention, and being part of a larger machine of the type adapted to handle a web of material such as wax paper material, which web may include a layer of aluminum foil or the like, suitable for use in the wrapping or packaging of gum sticks. A support bracket 22 is mounted to the machine frame by screws 24, 24 and a support member 26 is welded to the upper surface of the bracket 22. The member 26 includes an upstanding boss 26a at the front thereof, that is at the right hand side as viewed in FIG. 2, and a rear upstanding boss 26b both of which bosses are integrally attached to the member 26. The front boss 26a includes a threaded opening which carries a stop screw 28 and associated lock nut 30 such that the fore and aft position of a block 32 can be adjusted in a direction laterally with respect to the longitudinally moving web W. A compression spring 34 acts between a fixed nut 36 at the rear side of the member and urges the block 32 forwardly. As best shown in FIG. 1 the block 32 is also adjustably positioned longitudinally as a result of upstream and downstream stop screws 38 and 40 together with their associated lock nuts 42 and 44 respectively. Two screws 46, 46 extend upwardly through spacers 47, 47, and through openings in the member 26, being threadably received in the block 32 such that the block 32 is securely anchored to the member 26.

The fixed female die 18 is thus adjustably mounted in both the fore and aft, and the longitudinal direction. The female die 18 is anchored vertically in the block 32 by means of two screws 48, 48 best shown in FIG. 2. These screws 48, 48 extend upwardly through enlarged openings, provided for this purpose in the bracket 22 and associated member 26, and also through enlarged openings in the block 32, and the upper end portion of said screws 48, 48 are threadably received in the female die 18. Thus, the die 18 is not adjustable vertically or laterally with respect to the block 32, retaining ears being provided on the block, as indicated generally at 32a and 32b, in order to prevent relative motion therebetween in the lateral direction. The screw 28 and associated return spring 34 provided opposite said screw 28 permit fore and aft movement of the block 32, and hence of the female die 18, in a direction which can be considered to be lateral in connection with the longitudinal direction of movement of the web W.

Turning now to more detailed description of the female die 18, FIG. 3 shows this member as being of generally rectangular shape, and having a flat upper surface across which the web is adapted to move as mentioned previously. An outwardly, or upwardly open, U-shaped slot is provided in the female die 18 and the slot extends downwardly through the die member 18 being opened in the downstream direction, as also indicated in FIG. 3. The inner or upstream end of the said slot is well adapted to being formed is a relatively economical milling or boring operation. More particularly, the upper face of the die 18 together with the U-shaping cutting edge so oriented with respect to the web path that the legs of the U-shaped cutting edge extend in a downstream direction. The base of the U-shaped cutting edge can be seen from FIG. 3 to be arcuate or elliptical in configuration such that the inner portion of the base of the U comprises a semi-ellipse. This ellipse is adapted to be conventionally formed as a result of utilizing a milling cutter with a circular cross section at its cutting edge. The radius of such cutting edge preferably has a dimension indicated generally at $r$ in FIGS. 4a and 5a. As a result of providing a fixed female die 18 of this particular configuration it will be apparent to those skilled in the art that the U-shaped cutting edge defined at its upper surface 18b can be easily sharpened in an economic fashion either by a milling cutter or a reamer, and/or by a process of grinding the top or upper face 18b of the female die 18. The radius $r$ bears a predetermined relationship to the diameter $d$ ($d = 2 \times r$) of the cylindrical punch 16 to be described. However, prior to leaving the description of the fixed female die 18 it should be noted that the cutting edge 18c of the latter will have to be precisely oriented if the rotating punch 16 is to form a tab in accordance with the present invention. Thus, the reasons for providing for precise positioning of the female die 18 as described hereinabove with reference to FIGS. 1, 2, and 3 will be appreciated.

Actually, the female die 18 as located in the same position with respect to the center of rotation 14a of the rotating punch 16 in both the set-up illustrated in FIGS. 4a–4d inclusively, and also in FIGS. 5a–5d inclusively.

Turning next to a description of the cylindrical punch member 16, FIG. 1 shows the shaft 14 for supporting said punch 16 so that one laterally extending side edge of the punch is located in a common plane with the axis 14a of rotation of the shaft 14. The cylindrical punch 16 has a projecting end which is precisely ground normal to the axis of the punch so that the end face of the punch 16 is perpendicular to the center line of the punch 16, and thereby defines a generally circular cutting edge. The trailing edge half, or semi-circular portion of said circular cutting edge is adapted to cooperate with the elliptical cutting edge in the fixed female die 18 to form the desired tab in the web W. Just as with the female die 18 it is possible to fabricate the cutting edge of the punch in an inexpensive manner. The circular cutting edge of the punch can be easily fabricated by a grinding operation, and further, it is noted that both the punch and the female die have cutting edges which can be conveniently sharpened, thereby reducing downtime in the machine or apparatus itself.

The movable, or rotating punch 16 is received in a circular bore provided for this purpose in the shaft 14 and the end portion opposite the circular cutting edge is preferably threaded so as to be threadably received in the shaft 14. A lock nut 50 is also provided on the threaded end of the punch 16, which end also includes a slot 52 to permit the vertical position of the punch to be conveniently adjusted relative to the upper face 18b of the fixed female die 18, in order to set-up the tab cutting device in a manner to be described in greater detail hereinbelow. It is further noted that a flat 54 is provided parallel the axis of the bore in which the punch is located so as to facilitate this set-up operation. A perpendicular flat 56 is adapted to abut the lock nut 50 in order to anchor the punch 16 relative to the axis 14a of the shaft 14 once the desired set-up has been achieved. As shown in FIG. 1 the punch 16 is off-set radially in the shaft 14 by an amount corresponding to the radius of the punch 16, or at least one-half its diameter $d$, as depicted schematically in FIG. 4a.

Figure 4A:
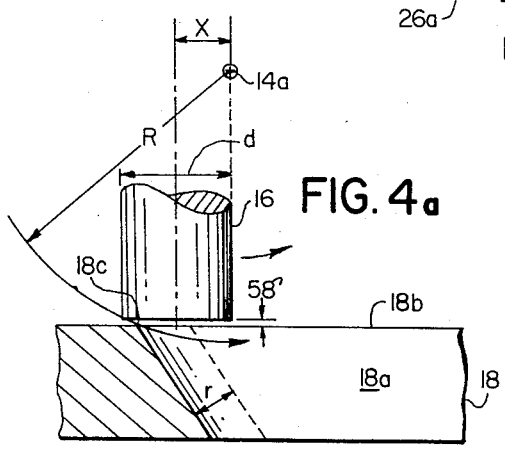
FIGS. 4a–4d inclusively illustrate, in a sequence of views, the movement of the rotating punch with respect to the fixed female die in the process of cutting a trailing tab from the continuously moving web.

With reference to FIGS. 4a–4d inclusively the punch 16 is there shown in a series of views so as to illustrate the action of the rotating punch 16 with respect to the fixed female die 18 in forming a "trailing" tab in the continuously moving web. The tangential speed of the cutting edge of the moving punch die 16 is preferably slightly greater than that of the moving web W so as to avoid tearing or crowding of the web material during the tab cutting operation depicted in FIGS. 4a–4d inclusively. FIG. 4a shows the radius of the path of movement for the punch die 16 by reference letter R.

Figure 5A:
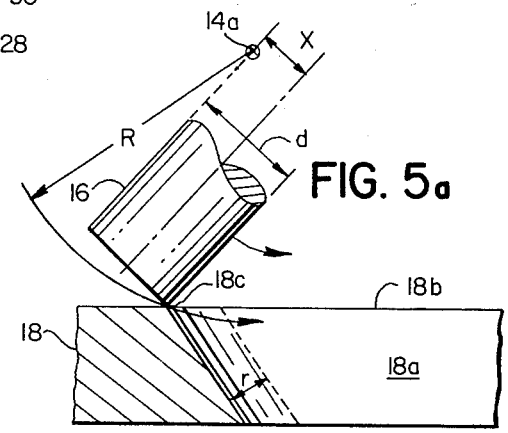
FIGS. 5a–5d inclusively illustrate, in a sequence of views, the motion of the rotating punch in the process of cutting a leading tab from the continuously moving web.
Figure 4B:
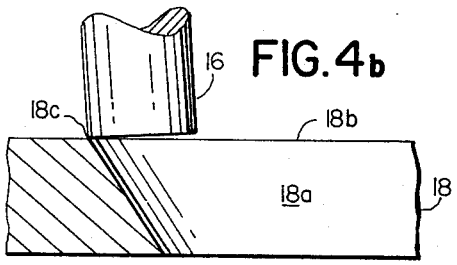
Figure 5B:
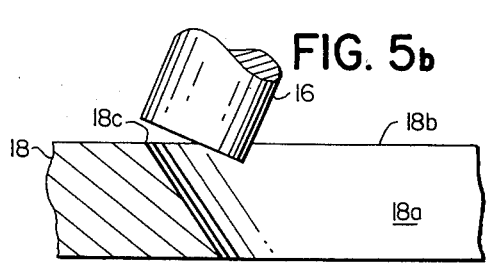
Figure 4C:
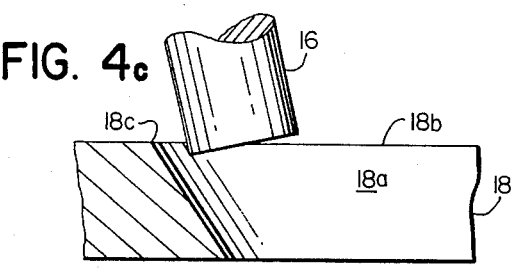
Figure 5C:
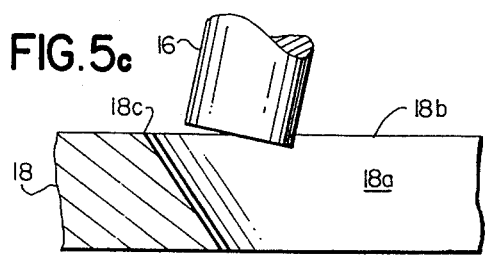
Figure 4D:
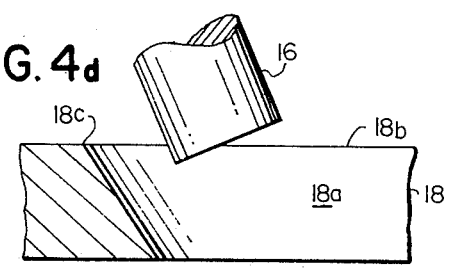

An alternative embodiment is depicted in FIGS. 5a–5d inclusively wherein the punch 16 is located in positive offset relationship to the center of rotation 14a of the shaft 14, that is, the offset X is provided in leading relationship to the direction of rotation of the punch 16. More particularly, the punch 16 rotates in the same counterclockwise direction as depicted in FIG. 4a, but whereas in FIG. 4a the offset X is negative, that is opposite the direction of rotation, the offset X in FIG. 5a is provided in the opposite or positive direction. The set-up of FIG. 5a–5d inclusively is intended to provide a tab which "leads" the web, and the speed or rotation for the cutting edge of the punch 16 is preferably made slightly less than that of the web W being cut, again to avoid tearing or crowding of the web material during the tab cutting process. It is important to note that in both the alternative version depicted in FIGS. 5a–5d inclusively, and in the above version depicted in FIG. 1 and FIGS. 4a–4d inclusively, the fixed female die 18 is located in the same relative position with respect to the axis of rotation 14a for the shaft 14. Thus, the only difference between these two embodiments is related to the speed of rotation of the cutting edge for the punch 16 and also in the mounting for the punch wherein the punch is either offset positively as depicted in FIG. 5 associated with a negative relationship between the punch speed and the speed of the web, or the punch is offset negatively as depicted in FIG. 4a as associated with a positive relationship between the punch speed and that of the web.

Figure 7:
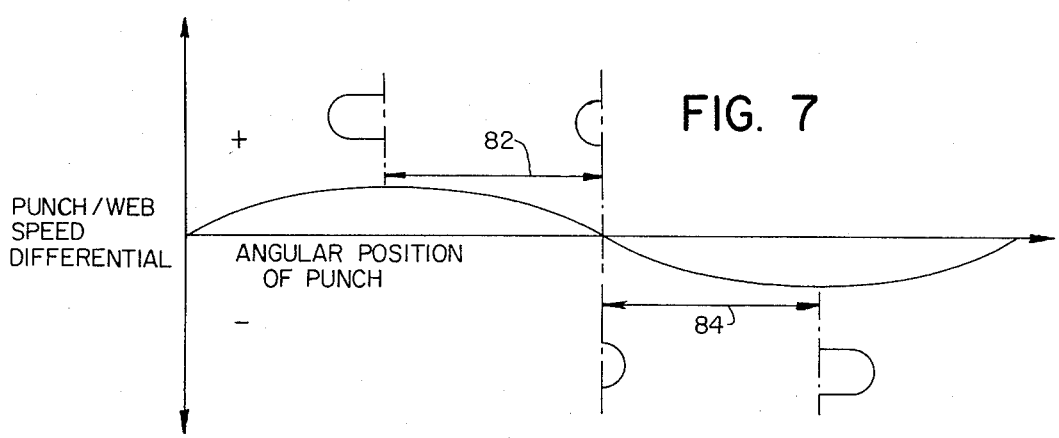
FIG. 7 is a graph illustrating the relationship between the tangential speed of the projecting punch, as a function of its angular position, and illustrates the variations in the tangential speed of this punch, at an angular position at which it cuts the web, relative to the constant speed of the web.

FIG. 7 illustrates this speed relationship and also provides a graphic comparison of the effects achieved as a result of increasing this speed differential between the punch and the web. As shown in FIG. 7 if the speed differential is maximized the length of the tab is correspondingly increased for a trailing tab. On the other hand, and as also depicted in FIG. 7, where the speed of the punch corresponds closely to that of the web a tab of crescent shape is cut in the web with no appreciable elongation of such tab. Means is provided for varying the speed of the shaft 14 so as to achieve the results depicted schematically in FIG. 7, and also means is provided for coordinating the location of the tab in the web so that the cut-off device 12 mentioned previously can be coordinated with the formation of the tab in the web to facilitate the proper forming of a package.

Figure 5D:
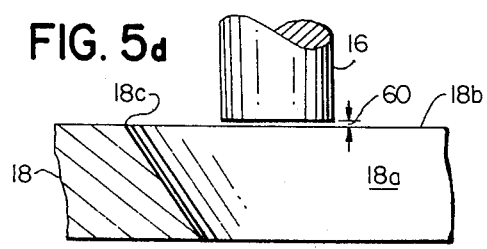

In the version of this invention depicted in FIG. 4a, it is the trailing semi-circular portion of the cutting edge at the end of the rotating punch die 16 which cooperates with the elliptically spaced cutting edge 18c of the fixed die 18 in order to form the trailing tab, whereas in the FIG. 5a version it is the leading semi-circular portion of the cutting edge in the rotating punch die 16 which cooperates with the fixed female die to form the oppositely disposed leading tab. However, in both the FIG. 4a and the FIG. 5a versions the cylindrical punch die 16 can be conveniently located for set-up merely by orienting the axis of the punch vertically as shown in FIG. 4a and FIG. 5d respectively as a result of the flat 54 provided for this purpose in the shaft 14. A predetermined vertical spacing must be adhered to as indicated generally at 58 in FIG. 4a between the lower end of the punch 16 and the upper face 18b of the fixed die 18. So too, when the shaft is configured to receive a punch in the manner depicted in FIG. 5a, rotation of the punch to the position shown in FIG. 5d will permit vertical adjustment of this punch 16 with respect to the upper face 18b of the fixed die 18 such that the predetermined vertical spacing, indicated generally at 60, will be obtained. As mentioned previously, the fixed die 18 is located at the same predetermined offset relationship with respect to the axis of rotation 14a. It will be apparent that the time and effort required to achieve the desired set-up of a device constructed in accordance with the present invention is greatly facilitated due chiefly to the unique arrangement and geometries of the male and female die members themselves.

Figure 6:
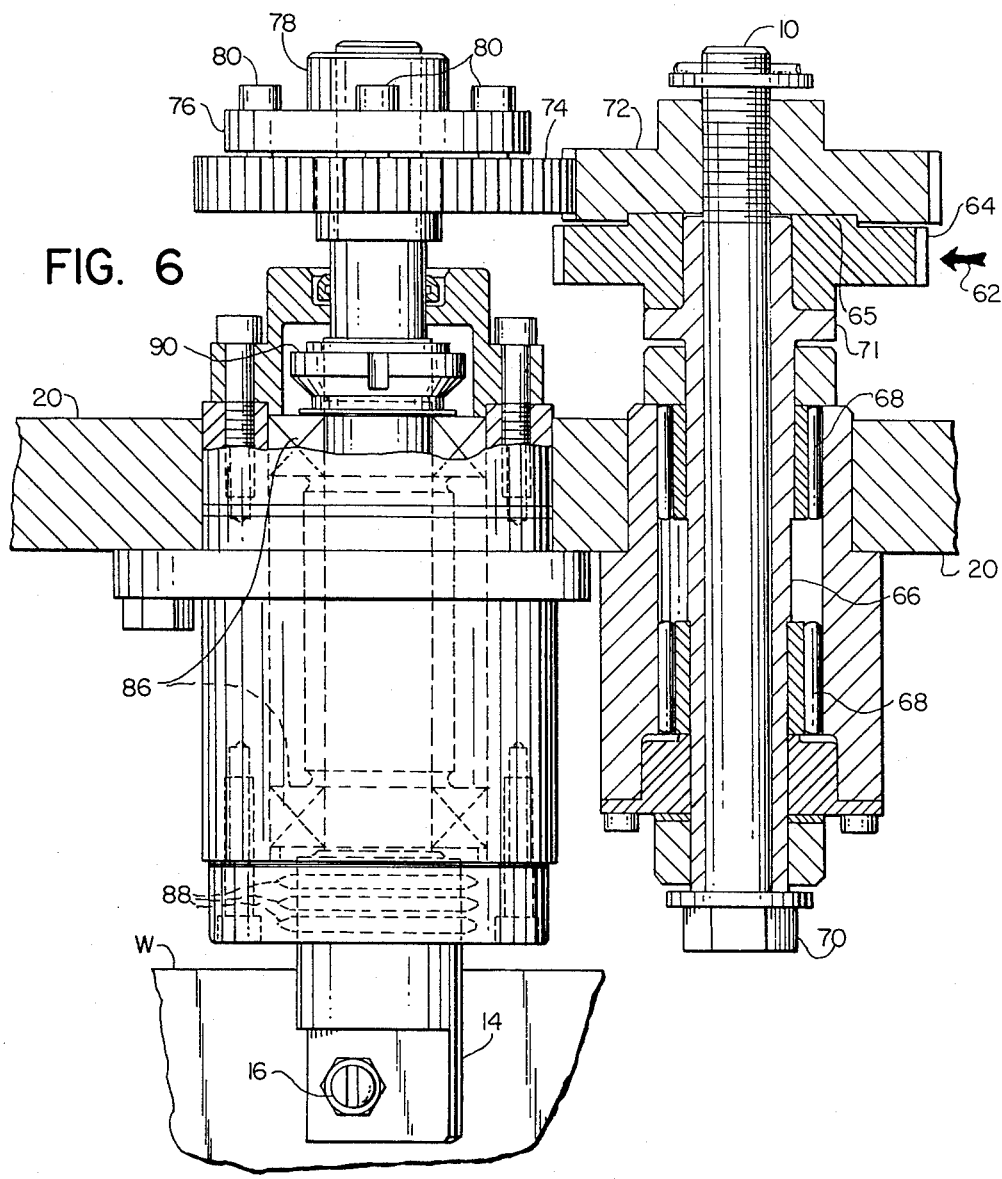
FIG. 6 is a horizontal sectional view taken generally on the line 6—6 of FIG. 1, and illustrates the means for rotating the shaft associated with the punch, together with the means for adjusting both the speed of rotation of the shaft, and also the phase adjustment of such shaft with respect to a web cutoff device, also illustrated in FIG. 1.

Turning next to a more detailed description of the means for rotating the shaft 14 in which the cylindrical punch die 16 is mounted, FIG. 6 shows a mechanism for rotating the shaft 14. An input drive to this mechanism is indicated generally at 62, whereby the gear 64 is rotated in a direction opposite that desired for the shaft 14, the gear 64 being provided on a hollow shaft 66 rotatably supported in the fixed frame 20 of the machine by means of bearings 68, 68. The clamp bolt 70 extends through the hollow shaft 66, and is threadably received on one of two meshing eccentric gears, 72 and 74, such that the eccentric gear 72 can be clamped to the driven gear 64 and caused to rotate therewith. A flange 71 on the shaft 66 abuts the drive gear 64. However, the clamp bolt permits the relative angular position of the input drive gear 64 and the eccentric gear 72 to be varied so as to correlate the locations for the tabs cut in the web W, with the cut off point determined by the rotating blade provided in the cut off device 12 mentioned previously with reference to FIG. 1. The shaft 14 is oriented parallel to the shaft 66 and is driven in the opposite, or desired direction by the meshing eccentric gear 74, which gear 74 is adapted to be adjusted angularly with respect to its shaft 14. This latter adjustment permits varying the speed of the punch relative to that of the web as referred to previously and as depicted schematically in FIG. 7. The means for clamping the eccentric gear 74 to the shaft 14 comprises a clamp ring 76 having a central hub portion 78 secured to the shaft 14 and defining a plurality of arcuate slots (not shown) for loosely receiving screws 80, 80 which screws are threadably received in the eccentric gear 74 such that the angular position of the output shaft 14 can be varied with respect to that of the eccentric gear 74. This arrangement permits the speed of the punch 16 to be varied with respect to the speed of the web at least through a desired range of values such as indicated generally at 82 in FIG. 7. Replacement of the shaft 14 with a shaft such as that described hereinabove with reference to FIG. 5a, that is with a shaft wherein the punch 16 is mounted so that it leads the direction of rotation, will allow the relative angular speed relationship between the punch 16 and that of the web W to be varied within the range depicted schematically at 84 in FIG. 7.

FIG. 6 also shows the means for rotatably supporting the shaft 14, said means including axially spaced bearings 86, 86 and a nut 90 which is for preloading these bearings 86, 86 to assure that the precise position of the punch 16, in the direction perpendicular that of the web travel is closely maintained during operation of the device.

We claim:

1. A device for cutting a tab from a continuously moving web, said device comprising a fixed female die below the path of movement of the web and having a flat face which defines an outwardly open slot having a U-shaped cutting edge so oriented with respect to the web path that the legs of the U extend downstream in the direction of movement of the web, the base of the U being arcuate, a movable punch die of cylindrical configuration and defining at least a semi-circular cutting edge at one end, means rotatably supporting said punch die so that said semi-circular cutting edge moves downwardly into said slot and in said downstream direction to cooperate with said arcuate fixed cutting edge for shearing the web.

2. The device according to claim 1 wherein said means rotatably supporting said punch die comprises a shaft rotatable on an axis spaced above said web path and oriented perpendicular said downstream direction, and means mounting said punch die to said shaft so that said cylindrical punch is oriented and rotates in a radial plane with respect to said shaft, but with the axis of symmetry of said punch being offset from a true radial direction with respect to said shaft, said semicircular cutting edge on said punch die being defined by the end face of the cylindrical punch which end face is oriented normal to the axis of symmetry of the cylindrical punch.

3. The device according to claim 2 wherein said slot defining said U-shaped cutting edge in said fixed female die has a lateral width approximately equal to the diameter of said cylindrical punch die, and wherein that portion of said slot defining said arcuate base segment of said fixed U-shaped cutting edge comprises a surface of revolution with a diameter also approximately equal that of said cylindrical punch die, and which surface has its axis oriented in said radial plane said axis being inclined with respect to the plane defined by said web path.

4. The device according to claim 2 wherein said punch die is offset in said shaft by an amount at least one-half that of said punch diameter.

5. The device according to claim 2 wherein said punch die is offset in said shaft such that the offset is positive, that is in the direction of shaft rotation.

6. The device according to claim 2 wherein said punch die is offset in said shaft such that the offset is negative, that is opposite the direction of shaft rotation.

7. The device according to claim 4 wherein said punch die is offset in said shaft such that the offset is positive, that is in the direction of shaft rotation.

8. The device according to claim 4 wherein said punch die is offset in said shaft such that the offset is negative, that is opposite the direction of shaft rotation.

9. The device according to claim 3 wherein said punch die is offset radially in said shaft such that the offset is positive, that is in the direction of shaft rotation, and manually adjustable means for presetting the rotational speed of said shaft such that said punch cutting edge travels at a tangtial speed at or slightly below that of the continuously moving web.

10. The device according to claim 3 wherein said punch die is offset radially in said shaft such that the offset is negative, that is opposite the direction of shaft rotation, and manually adjustable means for presetting the rotational speed of said shaft such that said punch cutting edge travels at a tangential speed at or slightly above that of the continuously moving web.

* * * * *

UNITED STATES PATENT AND TRADEMARK OFFICE
CERTIFICATE OF CORRECTION

PATENT NO. : 3,943,809
DATED : March 16, 1976
INVENTOR(S) : Lawrence W. Schoppee and Alfred D'Antonio It is certified that error appears in the above-identified patent and that said Letters Patent are hereby corrected as shown below:

Col. 3, line 53, after formed "is" should be --in--.

Col. 3, line 56, after the --U-shaped slot cooperate to define a-- should be inserted.

Col. 3, line 56, "U-shaping" should be --U-shaped--.

Col. 3, line 63, "conventionally" should be --conventiently--.

Col. 8, line 25, "tangtial" should be --tangential--.

Signed and Sealed this

Twenty-seventh Day of July 1976

[SEAL]

Attest:

RUTH C. MASON
Attesting Officer

C. MARSHALL DANN
Commissioner of Patents and Trademarks